United States Patent [19]
Bald et al.

[11] Patent Number: 5,021,265
[45] Date of Patent: Jun. 4, 1991

[54] ROLL ARRANGEMENT FOR NON-DEFORMING TREATMENT OF MOVING WEB-TYPE PRODUCTS

[75] Inventors: Wilfried Bald, Hilchenbach; Hugo Feldmann, Alsdorf-Warden; Manfred Pabst, Cologne; Rüdiger Fischer, Düsseldorf, all of Fed. Rep. of Germany

[73] Assignee: SMS Schloemann-Siemag Aktiengesellschaft, Düsseldorf, Fed. Rep. of Germany

[21] Appl. No.: 325,015

[22] Filed: Mar. 16, 1989

Related U.S. Application Data

[62] Division of Ser. No. 101,825, Sep. 28, 1987, abandoned.

[30] Foreign Application Priority Data

Oct. 9, 1986 [DE] Fed. Rep. of Germany ....... 3634367

[51] Int. Cl.⁵ ............................................. B05D 3/12
[52] U.S. Cl. .............................. 427/365; 427/434.4; 118/117; 72/247
[58] Field of Search .............. 427/365, 434.4; 72/247; 118/117

[56] References Cited

U.S. PATENT DOCUMENTS

| | | | |
|---|---|---|---|
| 3,083,120 | 3/1963 | Paterson | 118/424 X |
| 3,149,004 | 9/1964 | Fleissner | 118/68 X |
| 3,726,338 | 4/1973 | Sorenson | 29/116 AD |
| 4,400,957 | 8/1983 | Carlstedt et al. | 72/247 X |
| 4,440,012 | 4/1984 | Feldmann et al. | 72/247 X |
| 4,519,233 | 5/1985 | Feldmann et al. | 72/247 |
| 4,543,810 | 10/1985 | Stoy et al. | 72/245 |
| 4,706,601 | 11/1987 | Jahn | 118/46 |

FOREIGN PATENT DOCUMENTS

| | | |
|---|---|---|
| 0049798 | 4/1982 | European Pat. Off. . |
| 0091540 | 10/1983 | European Pat. Off. . |
| 2165118 | 7/1971 | Fed. Rep. of Germany . |
| 3107693 | 9/1982 | Fed. Rep. of Germany . |
| 480790 | 8/1975 | U.S.S.R. . |

Primary Examiner—Shrive Beck
Assistant Examiner—Alain Bashore
Attorney, Agent, or Firm—Toren, McGeady & Associates

[57] ABSTRACT

A roll arrangement for the non-deforming treatment of moving web-type or strip-type products. The arrangement includes at least two rotatable rolls which are adjustable radially relative to each other. The arrangement is used, for example, for drying one or both surfaces of the product. The rolls are axially adjustable in opposite direction and each roll has slightly S-shaped or bottle-shaped contour over the entire length of the roll body, in such a way that the contours of two rolls arranged on both sides of a roll gap complement each other only in a certain relative axial position of these rolls. In other axial positions of the rolls, the roll gap becomes narrower either in the center or at the ends of the rolls, so that a uniform pressing action or other uniform non-deforming treatment of the product is possible over the entire width of the product independently of the bending of the rolls and/or deviations from the plane-parallelism of the surfaces of the product.

15 Claims, 3 Drawing Sheets

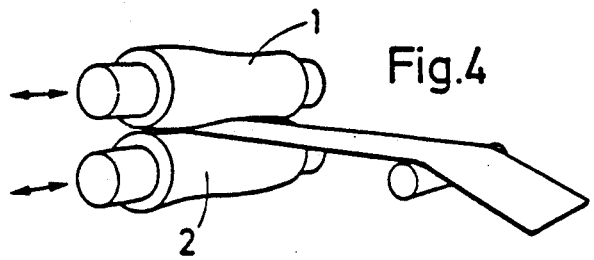
Fig. 4
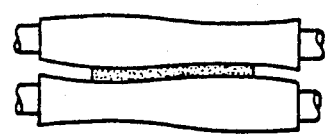
Fig. 1
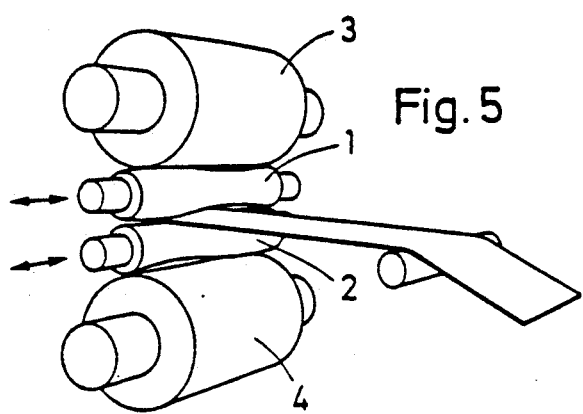
Fig. 5
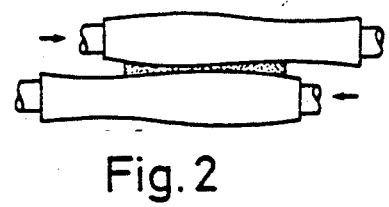
Fig. 2
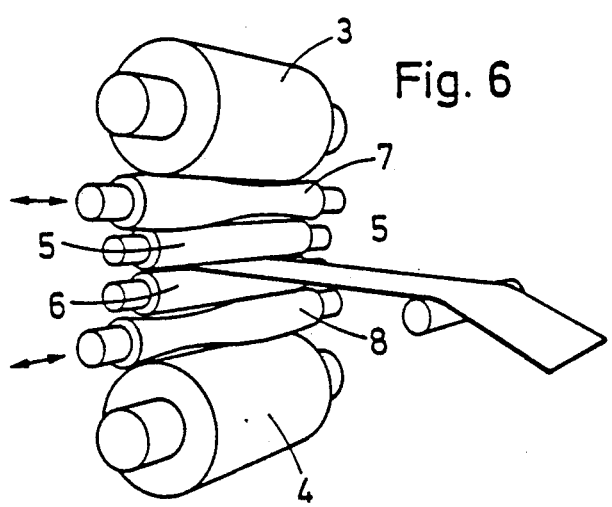
Fig. 6
Fig. 3
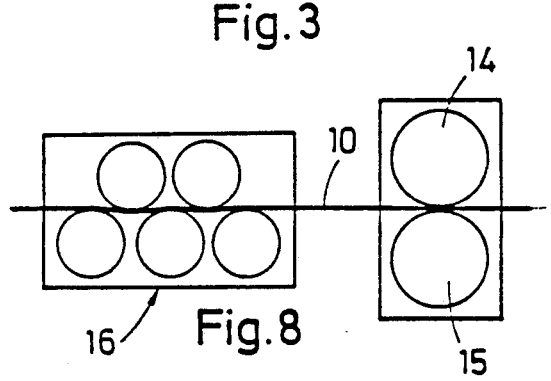
Fig. 8
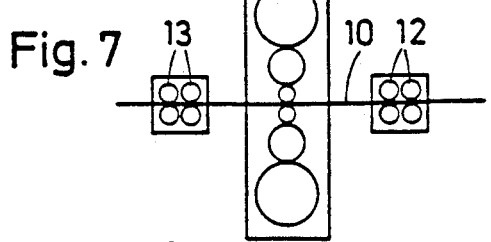
Fig. 7
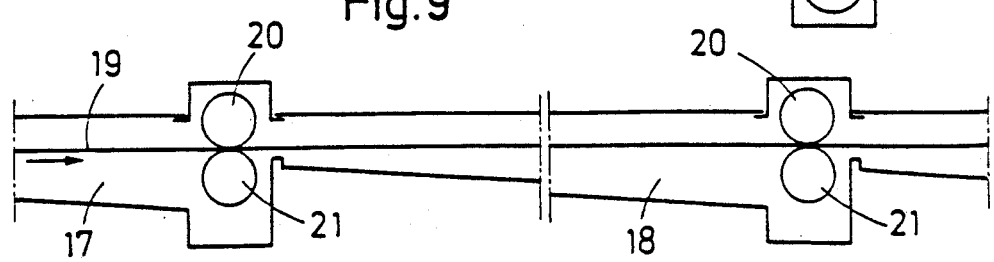
Fig. 9

ROLL ARRANGEMENT FOR NON-DEFORMING TREATMENT OF MOVING WEB-TYPE PRODUCTS

This is a divisional of Ser. No. 07/101,825, filed Sept. 28, 1987, abandoned.

BACKGROUND OF THE INVENTION

1. Field of the Invention

The present invention relates to a roll arrangement for the non-deforming treatment of moving web-type or strip-type products. The arrangement includes at least two rotatable rolls which are adjustable radially and axially relative to each other. The arrangement is used, for example, for drying one or both surfaces of the product.

2. Description of the Prior Art

The term "non-deforming treatment" mentioned above refers to a procedure in which two rolls act on a moving web-type product under such low pressure that essentially no permanent change of the contour or shape of the product takes place. However, this requirement does not exclude a change of the surface of the product, nor does it exclude a reduction in thickness of the product caused by dewatering, as it occurs in the production of paper by dewatering a fiber mat as an intermediate product. In that situation, a reduction in thickness is a secondary effect of the primarily desired dewatering of the intermediate product by means of pressing rolls.

The invention is based on the expedients that frequently moisture residues remain on a web or strip when the surfaces of solid web-type or strip-type products such as, for example, steel strip, are dried by means of pressing rolls in rolling mills or web treatment units. This is apparently due to the fact that the pressing action of the rolls is not uniform over the width of the products. This non-uniform pressing action is due to two reasons; the rolls bend under their own weight or due to the pressing forces acting on the roll journals, or the web or strip itself does not have a uniform thickness, i.e., it does not have plane-parallel surfaces. Of course, bending of the pressing rolls can be compensated by cambering the roll bodies or barrels by supporting the rolls by means of support rollers or support rolls. However, these measures do not permit quick adjustments to compensate for changing deviations from the contour of the web or strip or for changes in the forces acting on the web or strip.

To be able to quickly adjust a roll body into a shape deviating from the cylindrical, the so-called bending-controlled roll was developed in the paper industry for pressing rolls. Such a bending-controlled roll includes a fixed shaft, a rotatable cylindrical wall and a number of hydraulic pressure devices with pressure shoes supported by the shaft, the pressure devices being arranged distributed over the length of the roll and acting on the inner surface of the cylindrical wall, so that this wall can be shaped into any desired contour. However, such bending-controlled rolls are structurally very complicated and are only economical when the web or strip to be treated is very wide, as is the case in paper production or in rolling plastics material sheets, as disclosed in German Patent 2,165,118.

It is the primary object of the present invention to provide a roll arrangement for the non-deforming treatment of moving web-type or strip-type products, with at least two rotatable rolls which are radially adjustable relative to each other, which arrangement makes it possible to compensate quickly and in a structurally simple manner the negative influences resulting from bending of the rolls and non-uniform shape of the products.

SUMMARY OF THE INVENTION

In accordance with the present invention, rolls are used which are axially adjustable in opposite direction and which each have a slightly S-shaped or bottle-shaped contour over the entire length of the roll body, in such a way that the contours of two rolls arranged on both sides of a roll gap complement each other only in a certain relative axial position of these rolls.

Roll arrangements of this general type have been developed in recent years in rolling mill technology for the deformation of flat material in hot strip mills or cold strip mills, as disclosed in European patents 49 798 and 91 540. In rolling mills, the slightly S-shaped or bottle-shaped contour of two cooperating rolls in conjunction with the relative axial shifting of the rolls makes it possible to influence the profile of the strip.

The present invention utilizes the so-called continuous variable crown technology (CVC) with the aim to be able to vary, in an essentially non-deforming, i.e., more superficial, treatment of web-type or strip-type products by means of rolls generally, the intensity of the treatment over the width of the product, so that the desired effect of the treatment is optimized.

The roll arrangement according to the present invention is used, in addition to the above-described pressing of liquids from solid web-type or strip-type products having a high deformation resistance in order to dry these products, for pressing off or metering of coating materials, and the conveyance of solid webs or strips. The roll arrangement according to the invention may be used for a wide range of applications, such as, the pressing off products having no significant deformation resistance to the surface cleaning by means of brushes. Of course, depending on the type of application, each roll may be without drive or may be positively driven.

If the product to be treated has a great width, so that bending of the rolls cannot be compensated in an optimum manner by the continuous variable crown system used according to the present invention, a multiple-roll arrangement can be used with support rolls and/or intermediate rolls, as known from European patents 49,798 and 91,540. Such an arrangement can also be used for a sensitive adjustment of the contours of the treatment rolls which are effective during operation. The axial displacement devices needed for the rolls may be constructed in accordance with European patent 59,417. These displacement devices may be used in conjunction with bending devices for the rolls in order to achieve a further sensitive influencing of the treatment profile of the treatment rolls during operation. If sagging of relatively thin and long treatment rolls due to their own weight must be expected, it is recommended in accordance with the present invention to negatively counterbend the upper roll and to positively counterbend the bottom roll.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 1 is a schematic front elevational view of a two-high roll arrangement, wherein the continuous variable crown shapes of the rolls are shown exaggerated;

FIG. 2 is a schematic front elevational view of the two-high roll arrangement in a different relative axial position of the two rolls, wherein the arrows indicate the necessary axial displacement devices for the roll;

FIG. 3 is a schematic front elevational view of the two-high roll arrangement of FIG. 1 in another relative axial position of the two rolls, wherein the arrows indicate the necessary axial displacement devices for the roll;

FIG. 4 is a schematic perspective view of the two-high roll arrangement according to FIG. 1;

FIG. 5 is a schematic perspective view of a four-high roll arrangement;

FIG. 6 is a schematic perspective view of a six-high roll arrangement;

FIG. 7 is a schematic side view of a reversing cold rolling mill;

FIG. 8 is a schematic view of a driving and straightening unit for straightening hot or cold strip;

FIG. 9 is a schematic partial view of a strip pickling unit;

DETAILED DESCRIPTION OF THE INVENTION

Figure 10:
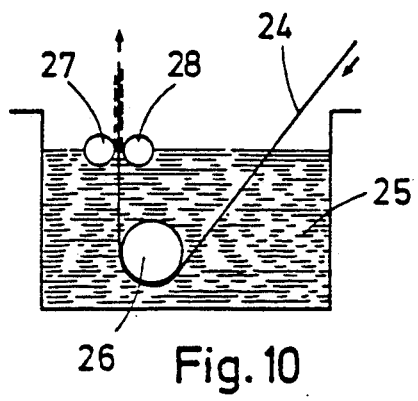
FIG. 10 is a schematic partial view of a hot galvanizing unit for metal strip.

FIGS. 1 to 3 of the drawing show a known roll arrangement for rolling material in three different positions.

FIG. 1 of the drawing shows the neutral position of two rolls which are slightly S-shaped in axial direction, shown in an exaggerated fashion. The two rolls are equal, however, are mounted turned by 180° relative to each other. The contours of the rolls complement each other only in this relative position shown in FIG. 1, resulting in a rolled material between the rolls which has uniform thickness over the width of the material. In FIG. 2 of the drawing, the upper roll has been shifted towards the right and the lower roll has been shifted toward the left, resulting in a negative camber of the roll gap, i.e., the rolled material is thinner in the middle than at the edges. Conversely, FIG. 3 shows the rolls shifted into the other end position in axial direction in order to obtain a positive camber of the roll gap, i.e., the rolled material is thicker in the middle than at the edges. By relative axial shifting of the rolls between the two extreme positions shown in FIG. 2 and FIG. 3, the roll gap can be easily and quickly adjusted in order to obtain different degrees of positive and negative camber.

The contour or shape of a roll may be considered a curve extending beyond the length of each roll. Thus, the contours of two rolls may complement each other within or outside of the reel lengths of the rolls. This means that the rolls do not necessarily have to have an S-shaped contour. For example, it may be that only web or strip material must be treated which has a profile as it is shown in FIG. 2, i.e., the material is thinner in the middle than at the edges. In that situation, the right-hand end of the upper roll and the left-hand of the lower roll could each be shortened by the length by which they extend beyond the other roll. The rolls would then be cigar-shaped.

In addition, it should be pointed out that an axial shifting of the rolls relative to each other does not have to start from the neutral axial position shown in FIG. 1. In order to reduce wear of the rolls in the region of the edges of the web or strip to be treated, it is advantageous to shift both rolls for a certain time together in axial direction and to influence the profile of the material to be treated starting from this position of the rolls by shifting the rolls in opposite direction.

With respect to the different roll arrangements illustrated in FIGS. 4 through 6 for carrying out the method according to the invention, it should be mentioned that a two-high roll arrangement according to FIG. 4 with treatment rolls 1 and 2 contoured or provided with continuous variable crowns according to the present invention for treating a web-type or strip-type product B will be used most frequently in actual practice for pressing liquid out of product B or for pressing liquid out of fiber material mats, felt or textile woven fabrics or meshed fabrics. Rolls 1 and 2 can be shifted in axial direction as illustrated in FIGS. 1 to 3, in order to adapt the treatment profile of the rolls in an optimum manner to the conditions presented by the product.

FIG. 5 shows an arrangement in which the two contoured and axially movable treatment rolls 1 and 2 are supported by thick, cylindrical support rolls 3 and 4.

In the arrangement shown in FIG. 6, the treatment rolls 5 and 6 as well as the outer support rolls 3 and 4 are cylindrical, while the intermediate rolls 7 and 8 have continuous variable crowns and are movable axially in opposite direction. The roll arrangements shown in FIGS. 5 and 6 are recommended for rolls having great lengths.

In the reversing cold rolling mill shown in FIG. 7, rolling is usually carried out with the addition of an emulsion which is recovered, depending on the rolling direction, by pressing action effected by two pressing roll pairs 12 or 13, respectively. These pressing roll pairs 12 and 13 are constructed as continuous variable crown rolls according to FIG. 4.

In the driving and straightening unit according to FIG. 8, metal strip 10 is pulled through the straightening roll arrangement 16 by means of two driven drive rolls 14, 15. Drive rolls 14, 15 are constructed as continuous variable crown rolls according to FIG. 4 in order to exert a uniform tensional force on the strip over the entire width of the strip, if this is required by the profile of the strip 10.

The strip pickling unit according to FIG. 9 includes two successive pickling containers 17, 18 in which the surface treatment of the metal strip 19 is carried out. A pressing roll pair 20, 21 each is provided at the end of each pickling container 17, 18 for pressing off any bath or renting liquid adhering to strip 19. Press rolls 20, 21 are continuous variable crown rolls according to FIG. 4 and make it possible, as described in connection with FIG. 7, to optimize the drying of the strip by axially moving the rolls in order to adjust them to the profile of the strip.

Figure 11:
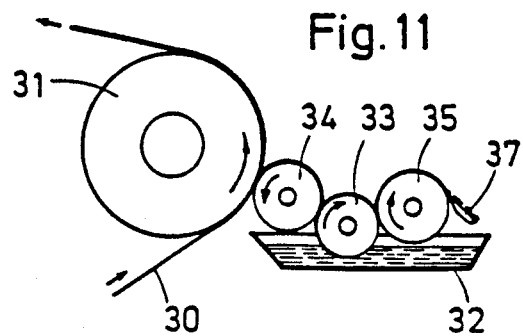
FIG. 11 is a schematic view of a strip coating unit.

In the hot galvanizing unit shown in FIG. 10, a metal strip 24 travels into a bath of molten zinc, is deflected by a guide roll 26 and emerges perpendicularly between two pressing rolls 27, 28 from the molten zinc. The spacing between pressing rolls 27, 28 determines the thickness of the zinc coating on the upwardly traveling strip 24, as indicated by broken lines. Pressing rolls 27, 28 are continuous variable crown rolls which, by the appropriate axial adjustment thereof, make it possible to provide the zinc coating with a desired profile or to ensure a uniformly thick zinc coating over the width of the strip if strip 24 does not have plane-parallel surfaces. The strip coating unit illustrated in FIG. 11 may be, for example, a varnishing unit for the unilateral finishing of a strip 30 which partially surrounds a pressure roll 31. The varnish is removed from a vessel 32 by means of a roll 33 which rotates in the vessel in the direction indicated by an arrow. The amount of varnish taken up by the roll 33 is transferred to a coating roll 34 which rotates in the same direction as roll 33, but in the opposite direction of pressure roll 31. As a result, the coating material is transferred onto the strip 30 traveling around pressure roll 31. Another roll 35 has the purpose to pick up any coating material still adhering to roll 33, wherein the material is then removed by means of a wiper 37 and is returned into the vessel 32. Roll 33 as well as coating roll 34 are continuous variable crown rolls, so that it is possible by appropriately axially shifting the rolls to influence the distribution of the coating material transferred between these rolls, in order to obtain a uniform coating thickness on strip 30 if the strip (steel, aluminum or the like) does not have plane-parallel surfaces.

It is also possible to construct pressure roll 31 as an axially movable continuous variable crown roll, so that the thickness of the coating material can be adjusted with even greater complexity.

Figure 12:
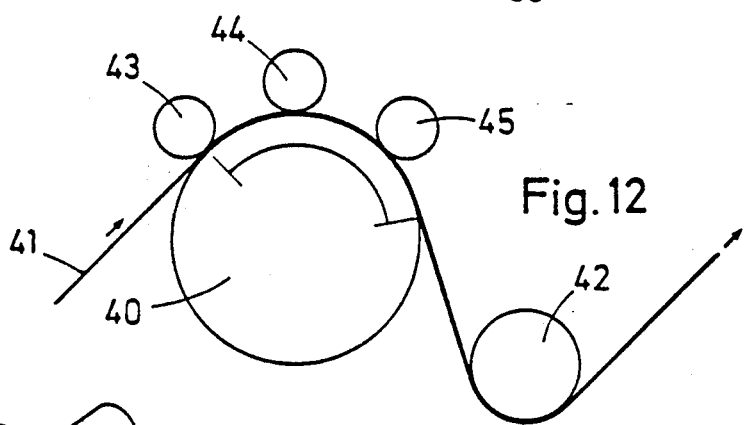
FIG. 12 is a schematic view of a so-called wet press for paper production.

The wet press illustrated in FIG. 12 of the drawing is used in the paper industry and includes an axially immovable treatment roll 40 which is partially surrounded by a predehydrated fiber mat 41. The mat 41 may then travel over a deflection roll 42 to another wet press. Within the angle of contact of the mat, three axially adjustable treatment rolls 43, 44, 45 are arranged around the treatment roll 40. Rolls 43, 44, 45 have a smaller diameter and are radially pressed against the circumference of roll 40. Treatment roll 40 is a continuous variable crown roll corresponding to treatment roll 2 in FIG. 4, while the smaller rolls 43, 44 and 45 pressed against roll 40 are provided with the continuous variable crown shape of the treatment roll 1 of FIG. 4. In this manner, within a very narrow space 3 press gaps are provided for the further dehydration of the fiber mat 41. The rolls can be adjusted in their relative axial positions in accordance with the continuous variable crown system, so that, for example, moisture can be pressed from the center of the fiber mat 41 toward the edges thereof. As is known in the paper industry, the dehydration can be improved by constructing treatment roll 40 as a suction roll, i.e., a roll having a perforated, rotatable shell in whose interior is arranged a stationary vacuum chamber located in the region of the dehydration zone.

Figure 13:
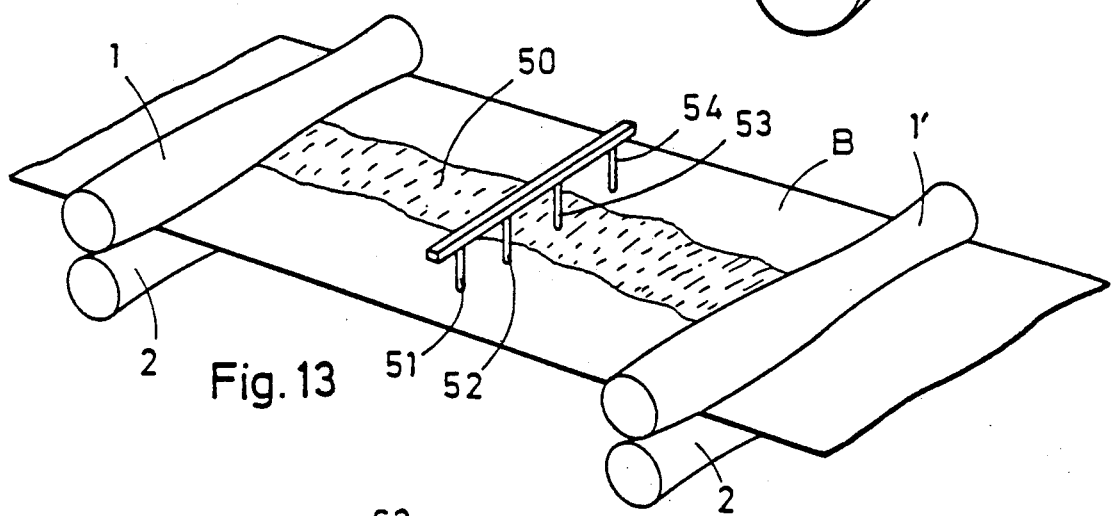
FIG. 13 is a schematic view of two successive two-high roll arrangements according to FIG. 4.

The schematic illustration according to FIG. 13 illustrates two successively arranged two-high roll arrangements of FIG. 4 used for pressing off liquid which adheres to metal strip E. The first pair of rolls 1, 2 as seen in travel direction of the strip is in the axially neutral position illustrated in FIG. 1. As is illustrated in FIG. 13, the pressing action of rolls 1, 2 is not optimized in the center of the strip because a moisture zone 50 in the middle of the strip remains. The axial shifting of the two pressing roll pairs is to be actuated independently from each other, so that the second pair of pressing rolls 1', 2', which are in the axial position of the rolls shown in FIG. 2, provide an increased pressing action of the rolls in the middle thereof. As a result, the drying effect is optimized.

The correcting axial adjustment of the second pressing roll pair 1', 2' can also be automated if several sensors 51 to 54 are arranged transversely of the travel direction of the strip B between the successive pairs of roll arrangements in order to be able to determine the treatment condition of the products. In the illustrated embodiment, the sensors are liquid sensors. As illustrated in FIG. 13, liquid sensor 53 responds and provides a signal according to which an axial displacement unit, not shown, for the second pair of treatment rolls 1', 2' is actuated.

Figure 14:
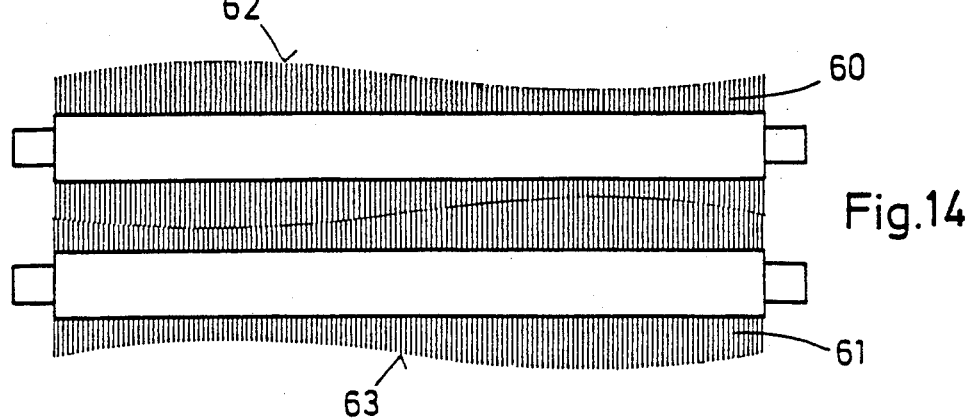
FIG. 14 is a schematic view of a roll arrangement with brush rolls.

FIG. 14 of the drawing shows an arrangement according to the present invention with brush rolls. Such an arrangement is only appropriate as a two-high roll arrangement. The characteristic feature of the continuous variable crown system is also in this situation that the outer contour of the bristles 60 or 61, preferably steel bristles for descaling or smoothing metal strip, is slightly S-shaped or bottle-shaped. As in solid rolls, the rolls may be shaped by grinding; the important aspect is the fact that the imaginary generating lines 62 and 63 connecting the ends of the bristles have the bottle-shaped contours which complement each other in the neutral position of the brush rolls illustrated in FIG. 14. In order to obtain a positive camber in accordance with FIG. 2, the brush action can be increased in the middle, while the negative camber of the brush rollers is used. Particularly recommended is an arrangement of two pairs of brush rolls, comparable to the arrangement illustrated in FIG. 13.

Figure 15:
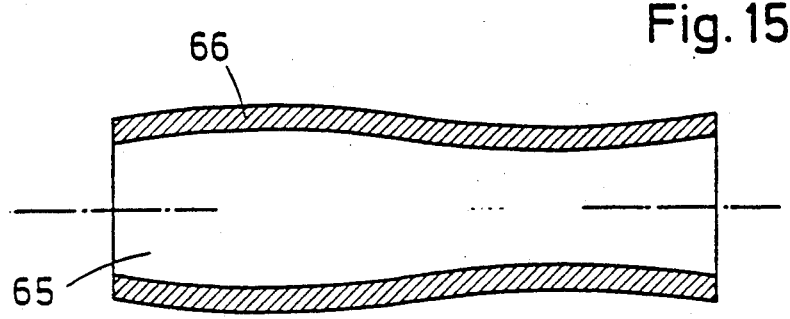
FIGS. 15 to 17 are sectional views of embodiments of contoured rolls having a wall of elastic material used for dehydrating flat textile materials.
Figure 16:
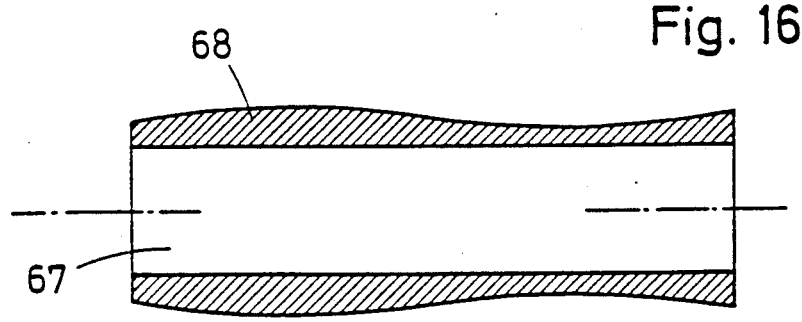
Figure 17:
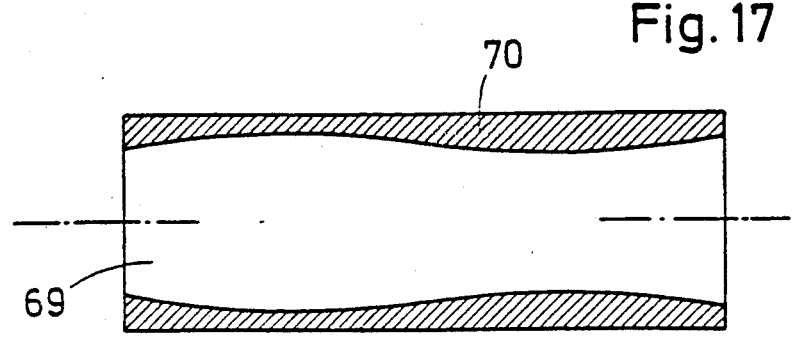

For the dehydration of flat textile materials in conjunction with a finishing process, it may be advantageous to coat the rolls with an outer layer of elastic material, for example, rubber. FIG. 15 shows a roll 65 having a continuous variable crown shape onto which a rubber layer 66 of uniform wall thickness is vulcanized, so that the surface coming into contact with the material to be treated also has the continuous variable crown contour. Continuous variable crown rolls provided with a layer of elastic material make it possible to exert pressure in a careful but sure manner on the textile material to be dehydrated, particularly thin materials. As is well known, the deformation of rubber onto pressure is always accompanied by the displacement of material which, in the present case of cooperating continuous variable crown rolls with rubber layers, takes place in the roll gap in circumferential direction as well as in axial direction of the rolls. However, each temporarily occurring material displacement in the roll gap has the result that the textile material traveling through the rolls is pulled with different intensities. Therefore, it may be advantageous to construct the rubber-coated continuous variable crown rolls in such a way that the continuous variable crown effect is present even if the outer rubber layer of each roll is of varying thickness along the length of the roll. For example, FIG. 16 shows a roll having a cylindrical, hard core 67 of metal and an elastic outer layer 68 whose outer surface is contoured and, thus, the layer 68 has differing wall thicknesses along the length of the roll. In the embodiment illustrated in FIG. 17, the hard core 69 has the contoured shape, while the elastic rubber layer 70 has a cylindrical outer surface. The continuous variable crown effect of a roll according to FIG. 17 is present in spite of the cylindrical outer surface because the elastic layer 70 is harder due to its smaller wall thickness in the area of the thicker portion of the contoured core 69 than in the area of the core 69 having the smaller diameter.

Also possible, but not shown in the drawing, is a roll which is provided with a plurality of layers. Each layer has a different modulus of elasticity and they also have different dimensions, so that the outer layer coming into contact with the material to be treated has over its length along the roll gap through which the material is conducted a uniform resilience. The uniform resilience of the elastic material independently of the relative axial positions of the continuous variable crown rolls makes it possible to eliminate undesired influences on the material to be treated due to increased material displacements of the elastic layers.

While specific embodiments of the invention have been shown and described in detail to illustrate the application of the inventive principles, it will be understood that the invention may be embodied otherwise without departing from such principles.

We claim:

1. In a method for the treatment of moving flat woven or mesh material of fiber, felt or textile by means of a roll arrangement including at least two rotatable treatment rolls which are adjustable radially and axially relative to each other, the rolls including roll bodies, each roll having a slightly S-shaped or bottle-shaped contour over the entire length of the roll body in axial direction thereof, wherein the contours of two rolls arranged adjacent each other and defining a roll gap therebetween each other only in a certain relative position of the rolls, the improvement comprising moving the material through the roll gap under low pressure such that the contour or shape of the products is essentially not permanently changed by the rolls.

2. The method according to claim 1, the roll arrangement including a pair of outer support rolls in contact with the treatment rolls, wherein at least one of the pairs of rolls is contoured and axially adjustable in opposite direction.

3. The method according to claim 1, a pair of outer support rolls and a pair of intermediate rolls in contact with the treatment rolls and the outer support rolls, wherein at least one of the pairs of rolls is contoured and axially adjustable in opposite direction.

4. The roll arrangement according to claims 1, 2 or 3, comprising dewatering or dehydrating flat woven or mesh material of fiber, felt or textile by means of the treatment roll.

5. The method according to claim 4, wherein the roll arrangement includes an additional axially immovable treatment roll, and at least two axially movable treatment rolls having a smaller diameter than the additional treatment roll, the treatment rolls of smaller diameter being arranged distributed over the circumference of the additional treatment roll.

6. The method according to claim 5, wherein the additional treatment roll is a suction roll.

7. The method according to claims 1, 2 or 3, wherein a second roll arrangement of the same type is arranged following the roll arrangement, comprising adjusting the pairs of contoured rolls of the two roll arrangements independently in their relatively axial positions.

8. The method according to claim 7, wherein the roll arrangement includes a plurality of sensors arranged transversely of the direction of movement of the material for local determinations of the treatment condition of the material, and axial displacement units for the contoured rolls, adjusting the axial displacement units of the roll arrangement downstream of the sensors by means of signals of the sensors.

9. The method according to claim 1, wherein the roll arrangement includes two treatment rolls, the rolls being brush rolls including bristles, the outer contour of the brush roll defined by the ends of the bristle being bottle-shaped.

10. The method according to claim 1, wherein the rolls are provided with an outer layer of elastic material.

11. The method according to claim 10, wherein the elastic material is rubber.

12. The method according to claim 10, wherein the rolls have a cylindrical, hard core of metal and the elastic layer has a bottle-like contour.

13. The method according to claim 10, wherein the rolls have a slightly bottle-shaped hard core of metal and wherein the outer surface of the elastic layer is cylindrical.

14. The method according to claim 10, wherein the rolls have a slightly bottle-shaped hard core of metal and the elastic layer has a uniform thickness over the entire length of the roll body.

15. The method according to claim 10, wherein the elastic layer is composed of a plurality of individual layers each having a different modulus of elasticity and different dimensions, so that the individual layer coming into contact with the material to be treated has a uniform spring characteristic over the axial length corresponding to the width of the material to be treated.

* * * * *